(12) United States Patent
Lauby et al.

(10) Patent No.: US 9,177,604 B2
(45) Date of Patent: Nov. 3, 2015

(54) MEDIA CONTENT FOR A MOBILE MEDIA DEVICE

(75) Inventors: William J. Lauby, Mukilteo, WA (US); Albert Y. S. Shum, Portland, OR (US); Anton O. A. Andrews, Seattle, WA (US); Jonathan R. Harris, Redmond, WA (US); Jeffrey C. Fong, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1101 days.

(21) Appl. No.: 12/125,944

(22) Filed: May 23, 2008

(65) Prior Publication Data

US 2009/0291677 A1   Nov. 26, 2009

(51) Int. Cl.
*H04Q 7/10* (2006.01)
*G11B 27/10* (2006.01)
*G11B 27/32* (2006.01)

(52) U.S. Cl.
CPC ............ *G11B 27/105* (2013.01); *G11B 27/322* (2013.01)

(58) Field of Classification Search
CPC .................................................. H04L 12/588
USPC ................ 455/43.04, 412.1, 556.1, 412, 418; 705/26, 27, 51; 707/769, 803, 913, 707/916, 954; 709/219, 227, 229
See application file for complete search history.

(56) References Cited

U.S. PATENT DOCUMENTS

| | | | |
|---|---|---|---|
| 6,721,489 B1 | 4/2004 | Benyamin et al. | |
| 6,965,770 B2 | 11/2005 | Walsh et al. | |
| 7,103,315 B2 | 9/2006 | Wilkinson | |
| 7,136,874 B2 | 11/2006 | Mercer et al. | |
| 7,216,008 B2 | 5/2007 | Sakata | |
| 7,262,357 B2 | 8/2007 | Plastina et al. | |
| 7,933,974 B2 | 4/2011 | Shum | |
| 8,171,112 B2 | 5/2012 | Shum | |
| 2003/0110503 A1 | 6/2003 | Perkes | |
| 2005/0174889 A1 | 8/2005 | Marcantonio et al. | |
| 2005/0251566 A1 | 11/2005 | Weel | |

(Continued)

FOREIGN PATENT DOCUMENTS

WO    WO-0135667    5/2001

OTHER PUBLICATIONS

"SYNC", 2007, Ford Motor Company, pp. 4.

(Continued)

*Primary Examiner* — Rafael Pérez-Gutiérrez
*Assistant Examiner* — Julio Perez
(74) *Attorney, Agent, or Firm* — Dan Choi; Judy Yee; Micky Minhas

(57) ABSTRACT

Various embodiments enable a user of a mobile media device to select one or more channels to load onto the device. Each channel comprises a collection of media content files, such as video content, audio content, and so on. Each collection of media content files can be associated with a particular genre (or genres) of media content. A channel can be managed such that its collection of media content can be rearranged, augmented, and/or otherwise edited to produce a refreshed version of the channel. A user's interaction with content within a channel can be monitored to produce behavior data about the user. The behavior data can be used to customize the playback of a particular channel to reflect user preferences. The behavior data can also be used to produce channels that are custom tuned for the user and can be used to produce a customized version of a mobile media device.

20 Claims, 11 Drawing Sheets

(56) References Cited

U.S. PATENT DOCUMENTS

| | | | |
|---|---|---|---|
| 2005/0286546 A1* | 12/2005 | Bassoli et al. | 370/432 |
| 2006/0059535 A1 | 3/2006 | D'Avello | |
| 2006/0062363 A1 | 3/2006 | Albrett | |
| 2006/0085751 A1 | 4/2006 | O'Brien et al. | |
| 2006/0143236 A1* | 6/2006 | Wu | 707/104.1 |
| 2006/0184968 A1* | 8/2006 | Clayton et al. | 725/56 |
| 2006/0206339 A1 | 9/2006 | Silvera et al. | |
| 2006/0242661 A1* | 10/2006 | Bodlaender et al. | 725/9 |
| 2006/0265091 A1 | 11/2006 | Mihura | |
| 2007/0010195 A1 | 1/2007 | Brown et al. | |
| 2007/0011007 A1 | 1/2007 | Greene et al. | |
| 2007/0025194 A1* | 2/2007 | Morse et al. | 369/30.1 |
| 2007/0125852 A1 | 6/2007 | Rosenberg | |
| 2007/0162395 A1 | 7/2007 | Ben-Yaacov et al. | |
| 2007/0168540 A1 | 7/2007 | Hansson | |
| 2007/0204311 A1 | 8/2007 | Hasek et al. | |
| 2007/0233743 A1 | 10/2007 | Rosenberg | |
| 2007/0239849 A1 | 10/2007 | Robbin et al. | |
| 2007/0247979 A1* | 10/2007 | Brillon et al. | 369/30.06 |
| 2008/0092046 A1* | 4/2008 | Bae | 715/716 |
| 2008/0092168 A1* | 4/2008 | Logan et al. | 725/44 |
| 2008/0108302 A1 | 5/2008 | Linnamaki et al. | |
| 2008/0117920 A1 | 5/2008 | Tucker | |
| 2008/0268772 A1* | 10/2008 | Linnamaki et al. | 455/3.04 |
| 2008/0320139 A1* | 12/2008 | Fukuda et al. | 709/226 |
| 2009/0150797 A1* | 6/2009 | Burkholder et al. | 715/747 |
| 2009/0293091 A1 | 11/2009 | Shum | |
| 2011/0145361 A1 | 6/2011 | Shum | |

OTHER PUBLICATIONS

"Roxio Launches Easy Media Creator 9", Sep. 5, 2006, Sonic Solutions, pp. 2.

"Apple iPod Touch Media Player", 1996-2006, zZounds Music, LLC., pp. 5.

"Cinemallow Partners with Samsung to Power Video Download Service for P2 Portable Media Player", Nov. 1, 2007, StreamingMedia.com, 2007, pp. 2.

"Create and Use Your Own Customized Playlists", Microsoft Corporation,(May 2006),3 Pages.

"Final Office Action", U.S. Appl. No. 12/125,938, (Aug. 6, 2010),14 pages.

"Music Playlist Utility", retrieved from <<http://www.programurl.com/music-playlist-utility.htm>> on Nov. 29, 2007, (Feb. 16, 2004),3 Pages.

"Non-Final Office Action", U.S. Appl. No. 12/125,938, (Feb. 22, 2010),11 pages.

"Notice of Allowance", U.S. Appl. No. 12/125,938, (Dec. 28, 2010),7 pages.

"Non-Final Office Action", U.S. Appl. No. 13/028,069, (Aug. 8, 2011),10 pages.

"Notice of Allowance", U.S. Appl. No. 13/028,069, (Jan. 24, 2012),6 pages.

\* cited by examiner

MEDIA CONTENT FOR A MOBILE MEDIA DEVICE

BACKGROUND

There is a wide availability of different types of media content for mobile media devices, such as audio content, video content, and the like. While most individuals are interested in taking advantage of this availability of media content, many of the currently available mobile media devices present significant barriers to some user's potential enjoyment of such content. Some mobile media devices require users to engage in time-intensive setup procedures and navigate cumbersome user interfaces before the device can be loaded with media content and utilized to enjoy the content. Some other devices are simpler but provide users with little or no control over media playback and simply provide a user with a single "bucket" of content to be played with no particular rhyme or reason with respect to the order in which the media content is played. Because of these barriers, many users fail to enjoy their interaction with mobile media devices, or simply avoid mobile media devices altogether.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable a user of a mobile media device to select one or more channels to load onto the device. Each channel comprises a collection of media content files, such as video content, audio content, and so on. Each collection of media content files can be associated with a particular genre (or genres) of media content. A channel can be managed such that its collection of media content can be rearranged, augmented, and/or otherwise edited to produce a refreshed version of the channel. A user's interaction with content within a channel can be monitored to produce behavior data about the user, as can other interactions. The behavior data can be used to customize the playback of a particular channel to reflect user preferences, produce channels that are custom tuned for the user, and/or produce a customized version of a mobile media device. It can also be distributed to other users via an online content management service for other customizations and uses.

BRIEF DESCRIPTION OF THE DRAWINGS

The same numbers are used throughout the drawings to reference like features.

DETAILED DESCRIPTION

Overview

Figure 1:
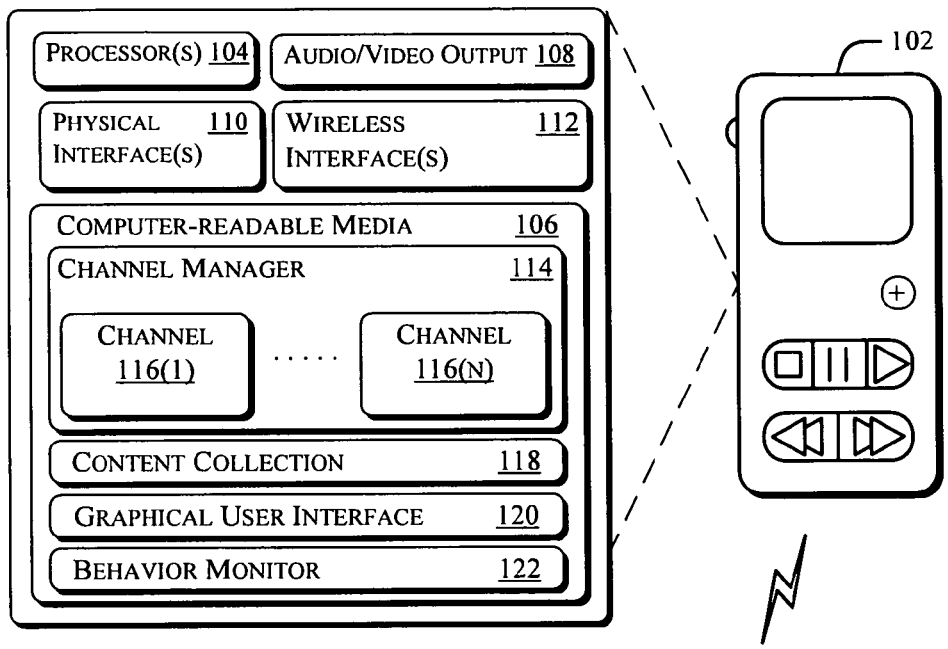
FIG. 1 illustrates an operating environment in which various principles and techniques described herein for the management of media content can be employed in accordance with one or more embodiments.
Figure 1:
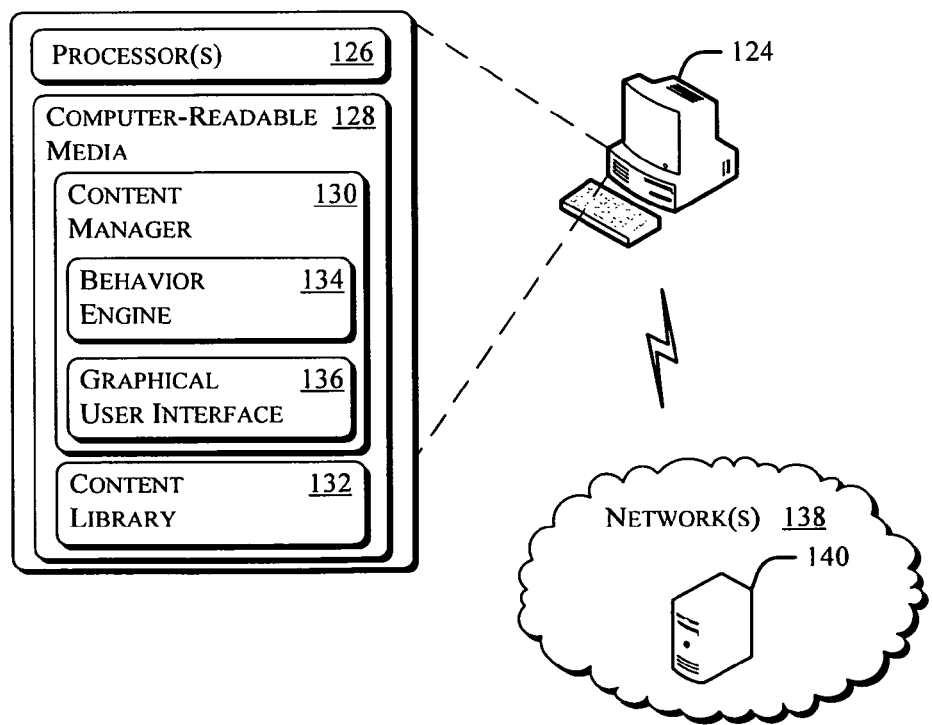

Various embodiments enable a user of a mobile media device to configure the mobile device (or any other suitable device, such as a desktop PC) to play media content that is preferred by the user. In one embodiment, a user interacts with a channel management service and/or a content management application to load one or more channels onto a mobile media device. A channel may comprise a preconfigured collection of media content files, such as video content, audio content, podcasts, pictures, information feeds, text files, and so on. Each channel and its collection of media content files can be associated with a particular genre of media content, artist, period, geographical region, and so on. For a mobile media device that is wireless-enabled, a channel may include a content feed from a radio station or other wireless content source. A channel also includes a channel metafile that comprises channel-specific data, such as a channel genre, the entity that created the channel, and so on. The channel metafile includes pointers to each of the individual media content files that are to be used to compose a channel.

A channel can be managed such that its collection of media content can be rearranged, augmented, and/or otherwise edited to produce a refreshed version of the channel. Channel management can be performed by one or more channel management services that provide preconfigured channels and other media content to media content consumers. A user of a mobile media device can access a channel management service via a network (e.g., the Internet) to receive a new channel and/or a refreshed version of a channel that the user has already loaded on the user's mobile media device. A channel management service can produce a refreshed version of a channel when new content becomes available and/or based on the preferences of an individual (e.g., the user of the mobile media device, a disc jockey, and so on) that manages the channel. A variety of different techniques for refreshing a channel can be utilized, such as refreshing channels on a periodic basis, customized refresh rates, and/or media content injection into a channel from one or more media content sources.

A channel can also be refreshed via media content injection into the channel from one or more media content sources, such as other users. For example, a user's channel can be configured to accept media content injection from the user's friends, family members, or other persons and/or entities that can recommend media content. In one such example, a user's friend discovers a particular piece of media content that the friend would like to recommend to the user. The friend can then forward the piece of media content to the user (e.g., to a media content application utilized by the user) so that the piece of media content can be added to one of the user's channels or otherwise made available to the user.

A channel can be refreshed in response to the mobile media device being connected to a particular resource, such as a desktop PC, a laptop, and so on. The refreshed version of the channel can be provided to the mobile media device for playback. Thus, a channel can provide a user with a dynamic media content experience without requiring the user to manipulate specific media content files.

In one example, a particular channel includes news-related media content. When the channel is refreshed, outdated news is deleted from the channel and up-to-date news is added to the channel. Thus, a channel management service can create a refreshed version of the channel, and when the channel is refreshed on a mobile media device, a previous version of the channel is replaced with the refreshed version. In the case of a news channel, this enables a user to have access to the latest news via the user's mobile media device.

User interaction with a channel can also be monitored to produce user behavior data. Interaction with a channel can include navigation through channel content, such as skipping media content, reversing through media content, forwarding through media content, repeating media content, and so on. Interaction with a channel can also include user characterization of media content. For example, a mobile media device can enable a user to provide feedback regarding media content in a channel. One way that a mobile media device can enable a user to characterize media content is to provide the user with a "favorites button" that, when pressed, marks the particular media content being performed or otherwise in focus as a favorite of the user. A "thumbs down" button may also be provided that, when pressed, marks media content as disliked by the user. Thus, user characterization of media content can include enabling a user to indicate qualitative assessments of media content.

The creation and playback of a channel can be customized using the user behavior data. For example, if during the playback of a channel a user skips over one or more songs by a particular artist (e.g., "Artist A"), the playback of the channel can be customized such that songs by Artist A are automatically skipped from that point forward. In another example, if a user marks songs by a particular artist with a "thumbs down" or other indication of disapproval, other songs by that artist will subsequently be automatically skipped during channel playback.

Behavior data can also be used to "tune" new channels and/or refreshed versions of channels that are loaded onto a mobile media device. For example, when a user connects the user's mobile media device to a device host (e.g., the user's desktop PC), behavior data can be transmitted from the mobile media device to the device host. In some implementations, the behavior data can then be transmitted from the device host to a channel management service. When a user selects a new channel to load onto the user's mobile media device, the new channel can be processed using the behavior data. For example, artists that the user has marked as favorites can be emphasized in compiling content for the new channel, and artists that the user has marked as disliked (e.g., "thumbs down") can be omitted and/or deleted from the new channel. Similar processing can also occur when a channel that was previously loaded on a user's mobile media device is refreshed. When a refreshed version of a channel is available, the refreshed version can be processed using the behavior data to add more content from favorite artists and/or delete content from disliked artists. User behavior data can be maintained on the mobile media device and utilized to customize playback and produce customized versions of multiple different channels. Over time, a significant body of user behavior data can be compiled and used to provide a user with content that is uniquely tailored to the user's particular preferences.

Behavior data can also be obtained from interaction with other users, e.g., via social interaction and/or social networking. For example, a user's content management application can be enabled to include a channel with links to another user's (e.g., a friend's and/or relative's) channel. Thus, one user's channel can be augmented or otherwise customized based on the behavior data of another user. Also, one user can receive a customized channel and/or channel content from another user. A content management application can also be configured to receive social links and content-based alert from other users. For example, a user's friend could recommend certain media content by sending an alert to the user's content management application. Based on this alert, the user's content management application could add the media content to one of the user's channels (e.g., a "Friends" channel) so that the user could play back the recommended media content. A user could also have one or more channels associated with a particular friend, family member, and so on. Thus, a user could have a "Sister" channel that is configured to be populated with content by the user's sister. The user's sister could log onto a content management service and specify and/or provide media content to be used to populate the "Sister" channel.

In the discussion that follows, a section entitled "Operating Environment" is provided and describes an environment in which one or more embodiments can be employed. Following this, a section entitled "Mobile Media Device" is provided and describes particular aspects of one embodiment of a mobile media device. After this, a section entitled "Graphical User Interface" is presented, which discusses one embodiment of a graphical user interface that can implement techniques and principles discussed herein. Finally, a section entitled "Example Processes" is provided and describes processes that can implement various principles and techniques discussed herein.

Operating Environment

FIG. 1 illustrates an operating environment in accordance with one or more embodiments, generally at 100. Environment 100 includes a mobile media device 102 having one or more processors 104 and one or more computer-readable media 106.

Mobile media device 102 also includes audio/video output devices 108, physical interface(s) 110, and wireless interface(s) 112. Examples of audio/video output devices 108 include audio speakers, a display screen (e.g., an LCD touch screen), LED indicators, and so on. Physical interface(s) 110 enable mobile media device 102 to physically interface with another device and/or resource and exchange data or other signal types. Examples of physical interface(s) 110 include, but are not limited to, a USB port, a USB plug, an Ethernet port, an analog audio input/output, and so on. Wireless interface(s) 112 enable mobile media device 102 to connect to a remote device or resource via a wireless connection.

Examples of wireless interface(s) 112 include, but are not limited to, a Wi-Fi interface, an RF interface, an IR interface, and so on.

Stored on computer-readable media 106 are a variety of modules that perform various functionalities for mobile media device 102. A channel manager 114 handles channel-related actions for the device, including loading a new channel, deleting a channel, refreshing a channel, and so on. Channel manager 114 includes a plurality of channels, shown here as channel 116(1) through channel 116(n). Two channels are illustrated here for purposes of this example embodiment only, and other embodiments of mobile media device 102 can store any suitable number of channels.

Also stored on computer-readable media 106 is a content collection 118 that can include a variety of different media content, such as content that is loaded at the time of manufacture of mobile media device 102, content that is loaded by the user, and so on. The media content in content collection 118 can include audio content, video content, and so on, and can be accessed by channel manager 114 to augment and/or otherwise customize a channel.

Computer-readable media 106 also stores a graphical user interface (GUI) 120 that can display media content and/or content-related information. In some embodiments, GUI 120 can include touch-screen functionality such that input can be provided to mobile media device 102 via physical interaction with a display generated by GUI 120. A behavior monitor 122 is also stored on computer-readable media 106. Behavior monitor 122 can track user interaction with mobile media device 102, with channels, and/or with other media content to compile behavior data about the user.

Environment 100 also includes a computing device 124, which can be embodied as any suitable computing device such as, by way of example and not limitation, a desktop computer, a portable computer, or a handheld computer such as a personal digital assistant (PDA), cell phone, and the like. Computing device 124 is configured such that it can interface with mobile media device 102, e.g., via physical interface(s) 110 and/or wireless interface(s) 112.

Computing device 124 includes one or more processor(s) 126 and one or more computer-readable media 128. Stored on computer-readable media 128 are a content manager 130 and a content library 132. Content manager 130 handles a variety of media content transactions for mobile media device 102 and includes a behavior engine 134 and a graphical user interface 136 to facilitate these transactions. Behavior engine 134 can retrieve behavior data from remote device 102, such as, for example, by requesting behavior data from behavior monitor 122. Content library 132 stores media content that can be loaded onto the mobile media device, and can store a variety of content, including channels and/or discrete media content files.

Environment 100 also includes a network 138, which can comprise any suitable network, such as a local access network (LAN), a wide area network (WAN), the Internet, and so on. As part of network 138 is a remote resource 140. While remote resource 140 is illustrated here as a server tower, this is not intended to be limiting, and remote resource 140 can include any suitable computing and/or storage resource or set of resources. Among other possible functions, remote resource 140 can act as a media content source and provide channel management services for computing device 124 and/or mobile media device 102. In one example, remote resource 140 hosts a web-based channel management service that creates channels, updates/refreshes channels, and makes new channels and/or refreshed channels available to a user of a mobile media device. The channel management service can also retrieve behavior data from behavior monitor 122 and/or behavior engine 134 to assemble tuned channels for a user.

Mobile Media Device

Figure 2:
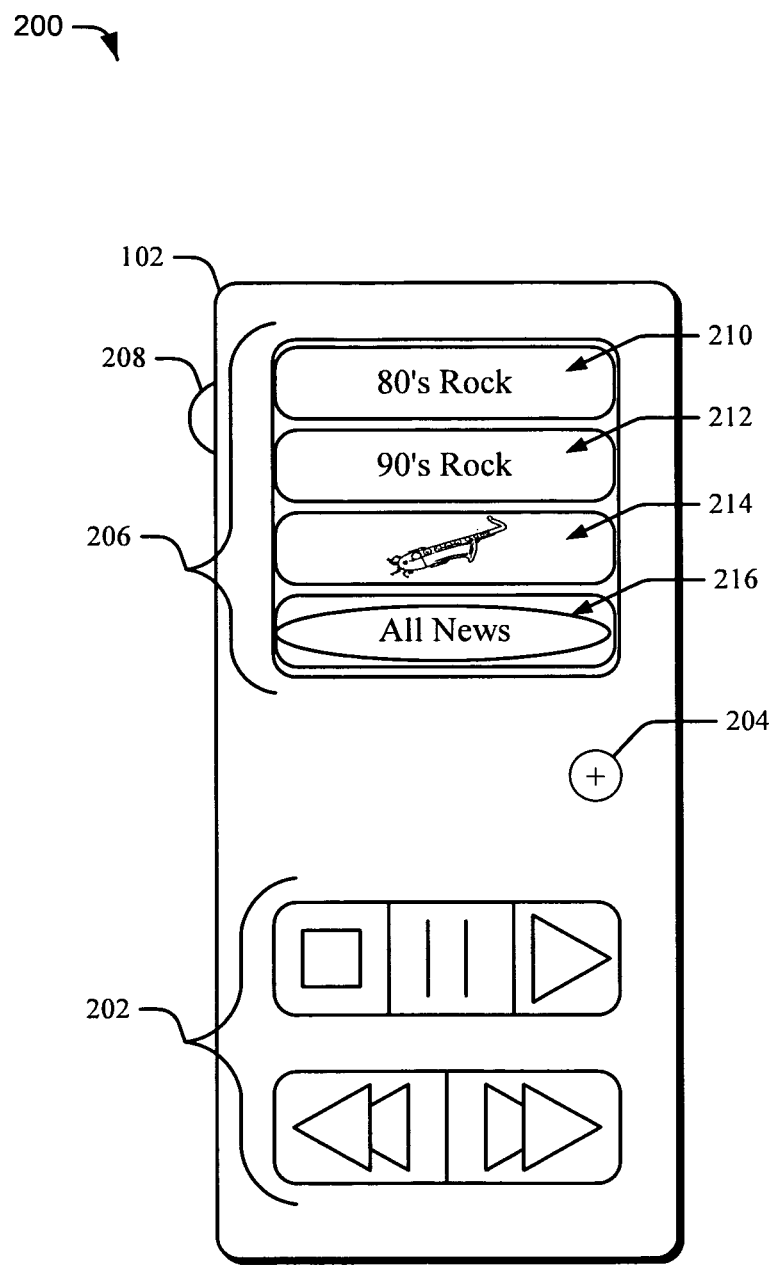
FIG. 2 illustrates one embodiment of a mobile media device that can implement various principles and techniques described herein.

FIG. 2 illustrates at 200 certain aspects of mobile media device 102. Mobile media device 102 is presented for purposes of example only, and a wide variety of different mobile media device configurations may be utilized without departing from the spirit and scope of the claimed embodiments.

Mobile media device 102 includes navigation controls 202, a power button 204, a display screen 206, and a selector button 208. Navigation controls 202 include a variety of selectable controls that enable a user to navigate media content stored on the device. In the illustrated example, navigation controls 202 include a stop button, a pause button, a play button, a rewind/skip back button, and a fast forward/skip forward button. Power button 204 enables a user to power on and power off mobile media device 102. Display screen 206 can utilize any suitable graphical display technology (e.g., LCD) and is configured to graphically display media content and/or data related to media content.

Selector button 208 can be configured to perform a variety of different functions for mobile media device 102. In one embodiment, selector button 208 is a scroll button that can be utilized to scroll from one channel to another and/or skip from one media content file to another media content file within a channel. Thus, in this embodiment, a user can press selector button 208 to skip over a particular media content file that the user does not like.

In some embodiments, selector button 208 can be configured by a user to perform one or more functions (e.g., navigation functions, audio volume, and so on) on mobile media device 102. In one example, selector button 208 can be configured as a favorites button. For example, when a user likes a particular piece of media content being played by mobile media device 102, the user can press selector button 208 to indicate that the user likes the media content and/or the artist performing the media content. The selection of selector button 208 can thus generate user behavior data that can be used to provide a customized media content experience for a user. Additionally and/or alternatively, selector button 208 can be configured as a "thumbs down" button that, when selected, indicates that the user does not like the particular media content being played and/or the artist performing the media content. The selection of a "thumbs down" button generates behavior data for assembling customized content for a user.

Although mobile media device 102 is illustrated with several navigation controls, other embodiments may utilize a more simplified form to create a less complicated user experience. For example, one embodiment of mobile media device 102 may be manufactured without navigation controls 202, e.g., and a user could navigate through channels and/or media content files using selector button 208. In such embodiments, selector button 208 can be configured to enable a user to skip forward through channels and/or media content files. If a user wishes to skip forward to a subsequent channel, the user would hold selector button 208 for a specific period of time (e.g., for more than three seconds). Alternatively, if a user wishes to skip forward from one media content file to another, the user would click selector button 208 (e.g., the user would hold the button for three seconds or less). Other methods of input to mobile media device 102 may be utilized, such as audio input, tactile input (e.g., via a touch screen), motion-related input (e.g., shaking and/or positioning the device in a certain way), and so on. Using these alternative methods of input can enable a very simple form of mobile media device to be created, one that has no external controls and/or display.

A user could simply provide tactile and/or motion related input to the device to activate particular device functionalities.

Four channel icons are displayed on display screen 206: a channel icon 210; a channel icon 212; a channel icon 214; and a channel icon 216. Each channel icon is a graphical representation of a channel that is loaded on mobile media device 102, and each channel represents a particular collection of media content files. Channel icon 210 represents an "80's Rock" channel, which is a collection of media content files that are associated with a genre of music known as "80's Rock" (e.g., media content associated with rock and roll music from the era of the 1980's). Channel icon 212 represents a "90's Rock" channel.

Channel icon 214 displays an image of a saxophone. In some embodiments, a channel icon can contain a pictorial representation of a particular channel. For example, a DJ (disc jockey) or VJ (video jockey) can provide content for a channel and can also provide a pictorial representation of the channel. In another example, a user of mobile media device 102 can select an image to be used to represent a particular channel. In this example, channel icon 214 represents a jazz channel, and an image of a saxophone is displayed on the channel icon to indicate that the channel is a jazz channel.

Channel icon 216 represents an "All News" channel. This channel is a collection of media content that would fall under the category of general news information (e.g., current events in a variety of subject areas, such as politics, sports, business, and so on). As indicated by the oval shape overlaying channel icon 216, the "All News" channel is currently selected for playback on mobile media device 102. As discussed above, channels may be selected for playback by scrolling through the channels via selector button 208. As channels are selected for playback, a graphical representation will indicate that a particular channel is currently selected, such as the oval illustrated here. A wide variety of graphical representations and indications may be utilized without departing from the spirit and scope of the claimed embodiments.

This discussion of channels and channel management concepts with reference to a mobile media device is not intended to preclude the use of desktop computers, gaming systems, and other "less mobile" devices to experience channel-based media content. In some embodiments, a user can use a desktop computer to view, select, investigate, sample, and/or play back one or more channels. A user can also experience content and channels via a web-based channel service interface. User behavior data can be captured from user interaction with a mobile media device, with a desktop PC, and/or any other suitable device. Thus, the channels and channel management concepts discussed herein are applicable to a wide variety of platforms and devices, including mobile and non-mobile devices.

Graphical User Interface

Figure 3:
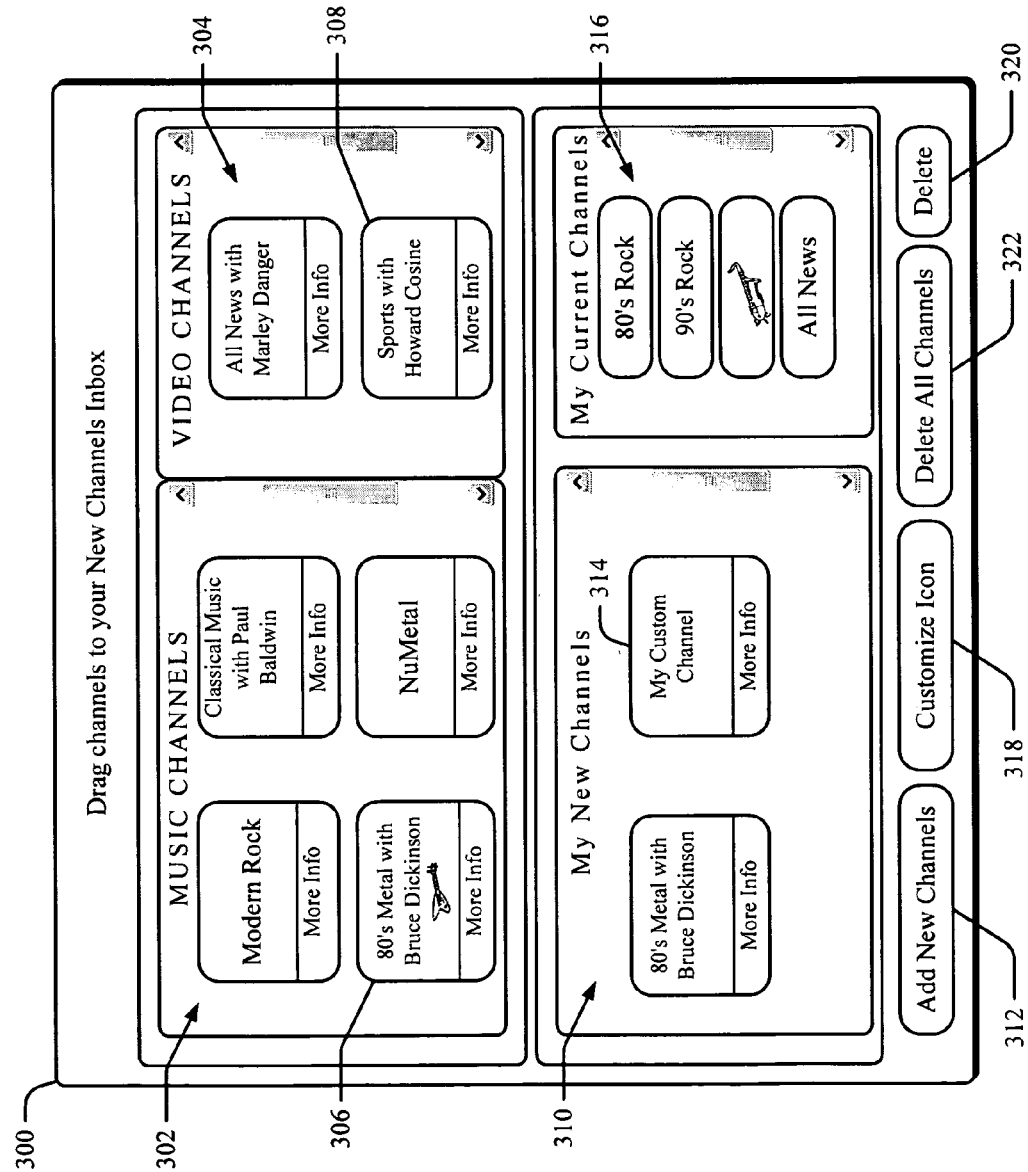
FIG. 3 illustrates one example of a graphical user interface that can implement various principles and techniques described herein and in accordance with one or more embodiments.

FIG. 3 illustrates an example of graphical user interface (GUI) 300 that can implement one or more aspects of the techniques and processes discussed herein. GUI 300 can be displayed on a computing device (e.g., computing device 124) that is connected to or is otherwise being used to manage a mobile media device. GUI 300 includes a music channel menu 302 and a video channel menu 304. These channel menus include channel menu icons (e.g., a channel menu icon 306) that represent channels that can be loaded onto a mobile media device.

Channel menu icon 306 represents a channel designated as "80's Metal with Bruce Dickinson", which is a collection of media content files (e.g., audio files) that are associated with the genre of heavy metal music from the era of the 1980's. This channel also has a DJ named Bruce Dickinson, who is responsible for selecting and/or arranging media content for the channel. The DJ can provide commentary for the channel, such as historical and/or biographical information about the content and the artists associated with channel's media content. Also shown as part of channel menu icon 306 is a "More Info" area that can be selected to provide more information about the channel represented by the icon.

Video channel menu 304 includes a channel menu icon 308, which represents a channel designated as "Sports with Howard Cosine". This channel is a collection of media content files (including video files) that are associated with sports and sports-related information. As with channel menu icon 306, channel menu icon 308 has a "More Info" area that can be selected to provide more information about the channel represented by the icon.

GUI 300 also includes a channel inbox 310, which is populated with channel menu icons for channels that a user wishes to load onto a mobile media device. In one embodiment, a user drags a channel menu icon from a music channel menu and/or a video channel menu to channel inbox 310. The channel menu icon is "staged" in the channel inbox until the user is finished selecting channels to load. The user then selects an add button 312 to load one or more channels from channel inbox 310 to a mobile media device. In some embodiments, selecting add button 312 initiates a synchronization process whereby one or more channels are written to the memory of a mobile media device.

Also displayed in channel inbox 310 is one example of a custom channel icon 314 that represents a custom channel containing particular media content files that are selected by the user. The user can select individual songs, videos, and/or other media content files to populate the custom channel. The media content files can be selected from a web-based collection of media content or from a source local to the user, such as a CD or other data storage medium.

A current channels menu 316 is also included as part of GUI 300. Current channels menu 316 includes a list of channels that are currently loaded on a mobile media device that is being managed via GUI 300. Thus, when a user connects a mobile media device to a computing device (such as a desktop PC), a media content management application can be launched (e.g., content manager 130) that generates GUI 300. The computing device reads the mobile media device's memory and populates current channels menu 316 with a list of channels that are stored on the mobile media device. If a user adds and/or deletes channels from a mobile media device during a channel management session, current channels menu 316 will be updated to reflect these additions and/or deletions.

A customize icon button 318 can be selected to activate functionality to enable a user to customize a channel icon for the user's mobile media device. For example, selecting customize icon button 318 may generate a window with graphical images that can be selected to be displayed on a particular channel icon. Thus, a user can supplement or replace the text and/or image displayed on a channel icon with a graphical image and/or text of the user's own choosing. When the channel is transferred to the user's mobile media device, the graphical image and/or text chosen by the user is automatically transferred to the corresponding channel icon on the user's device. For example, with the "Sister" channel discussed above, the user could provide a picture of the user's sister to be displayed in conjunction with the "Sister" channel.

GUI 300 also includes a delete button 320 and a delete all channels button 322. A user can select one or more channels from current channels menu 316 and then select delete button 320 to remove the channel from the mobile media device. If a user wishes to delete all of the channels currently stored on a mobile media device, the user can select delete all channels button 322 to delete all of the channels currently stored on the device.

Example Processes

FIGS. 4-11 illustrate examples of processes and implementation scenarios that implement aspects of the principles and techniques discussed herein. These processes can be implemented in connection with any suitable hardware, software, firmware, or combination thereof.

Figure 4:
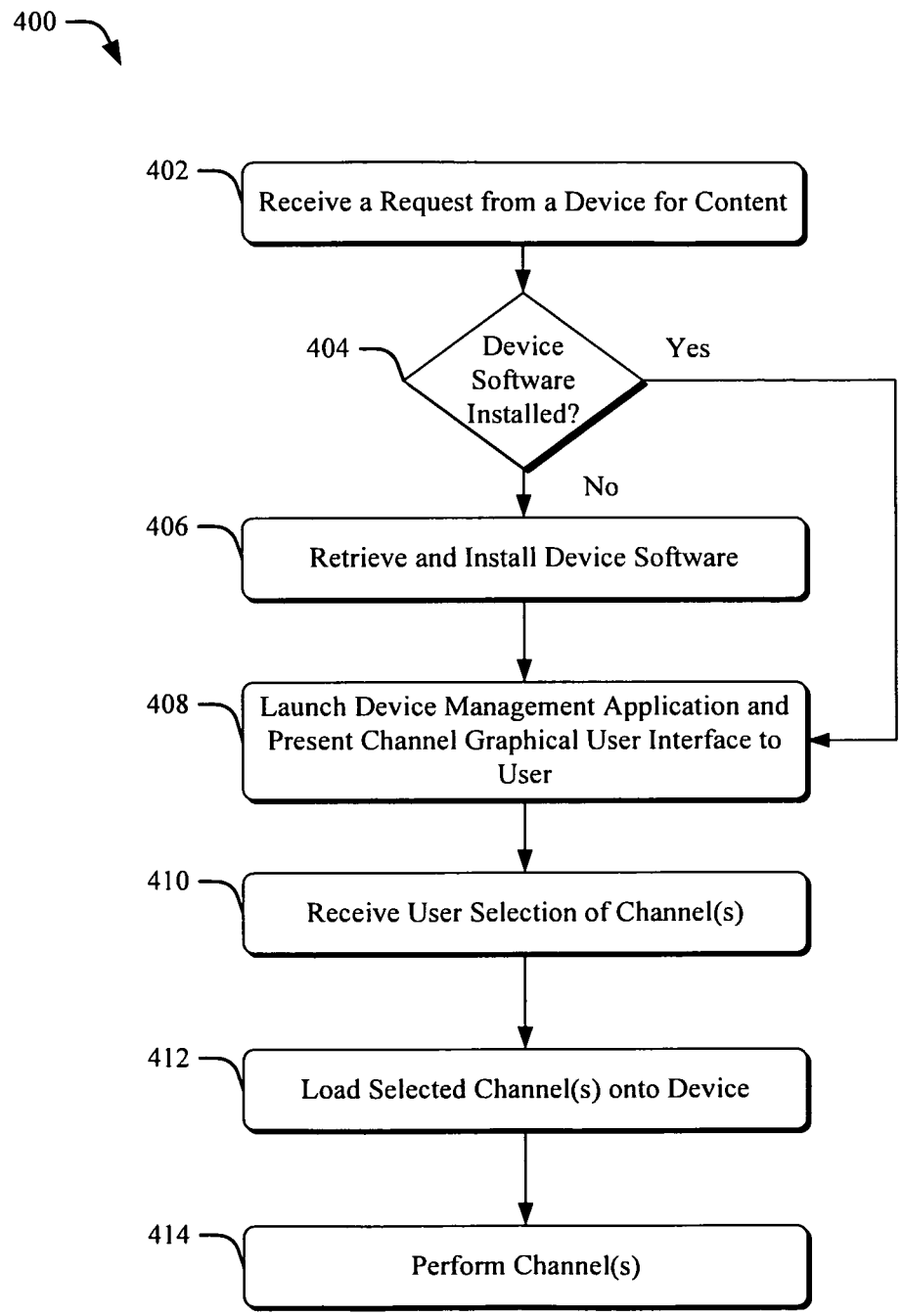
FIG. 4 is a flow diagram of a process for loading channels on a mobile media device according to various principles and techniques described herein in accordance with one or more embodiments.

FIG. 4 illustrates a flow diagram 400 that represents one process for populating a mobile media device with one or more channels in accordance with one or more embodiments. At 402, a request for media content is received from a mobile media device. The request can be received at a computing device (such as computing device 124 and/or remote resource 140) and in response to the mobile media device being connected to the computing device. At 404, the computing device determines if a device management application is installed (e.g., content manager 130) that enables media content to be loaded onto the mobile media device. If a device management application is not installed, at 406 the application is retrieved and installed. In one embodiment, the device management application is provided on some type of external storage medium, such as a compact disc, a flash drive, and so on. Additionally and/or alternatively, the device management application is downloaded from a remote resource via a network, such as the Web. In another embodiment, the application is stored on the mobile media device itself and is retrieved from the mobile media device and installed onto the computing device.

If a device management application is already installed, or once it is installed, at 408 the application is launched and a graphical user interface (e.g., GUI 300) is presented that enables a user to select one or more channels to be loaded onto the mobile media device. At 410, a user selection of a channel is received and at 412, the selected channel is loaded onto the mobile media device. At 414, one or more channels are performed (e.g., played back) by the mobile media device. In some embodiments, channels selected by the user are also available for play back and/or editing at the user's desktop PC or other device, as well as via a channel management service and/or application.

In another example embodiment, when a request for media content is received from the mobile media device, the device is automatically populated with one or more channels without requiring the user to select any channels. This enables a user to simply connect the user's mobile media device to a channel management service and automatically receive channels without the need to interact with the service. Channels can be selected based on a variety of criteria, such as the most popular channels, the newest channels, and/or based on media content that the user has stored on the mobile media device or on the user's personal computer.

Figure 5:
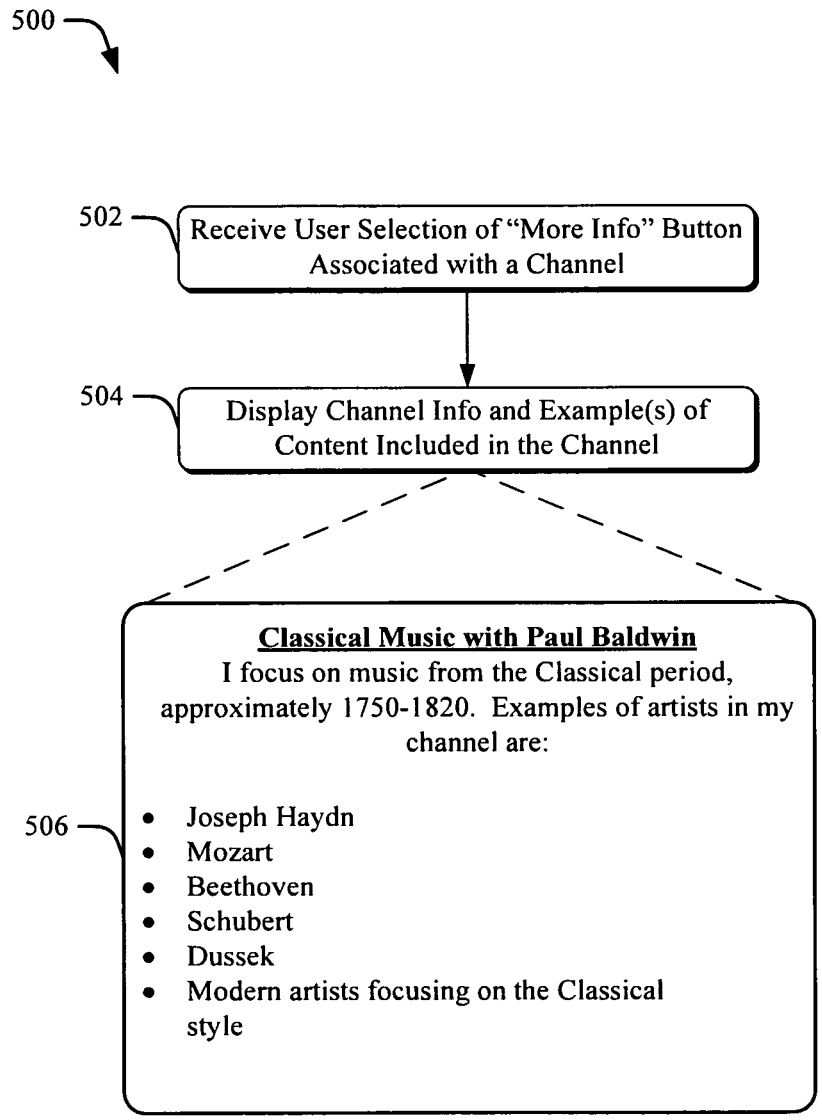
FIG. 5 is a flow diagram of a process for obtaining information about a channel that utilizes various principles and techniques described herein in accordance with one or more embodiments.

FIG. 5 illustrates a flow diagram that represents a process 500 for presenting a user of a mobile media device with more information about a channel in accordance with one or more embodiments. At 502, a user selection of a "More Info" region or button associated with a channel is received (e.g., such as that illustrated by channel menu icon 306). At 504, information is presented to the user concerning the channel. The information can be presented to the user in a variety of forms, such as a channel information window 506 that contains a variety of different information about the channel. As illustrated, channel information window 506 includes a description of the media content associated with the channel (e.g., the genre "Classical Music") and a few examples of the artists and/or content represented in the channel.

Figure 6:
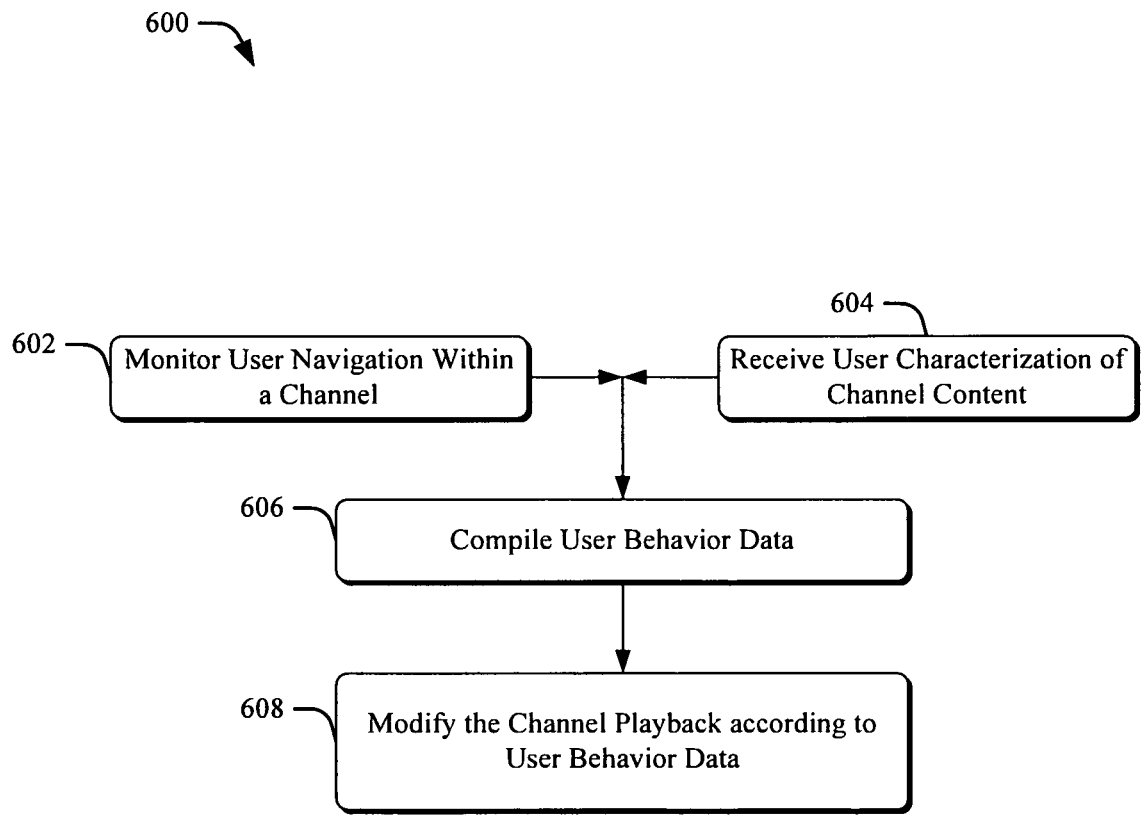
FIG. 6 is a flow diagram of a process for utilizing user behavior data to modify channel playback that implements various principles and techniques described herein in accordance with one or more embodiments.

FIG. 6 illustrates a flow diagram that represents a process 600 for using user behavior data to customize channel playback on a mobile media device in accordance with one or more embodiments. At 602, a user's navigation within a channel is monitored and at 604, user characterization of media content within a channel is received. Examples of user navigation within a channel and user characterization of media content are discussed above. User navigation within a channel and/or user characterization of media content can occur on a mobile media device, a desktop PC, via a web-based content management service, and/or any other suitable device and/or platform. At 606, the user's navigation and/or characterization behavior are compiled to produce user behavior data. These behaviors are presented for purposes of example only, and other user interactions with media content may be monitored to produce user behavior data without departing from the spirit and scope of the claimed embodiments. Channel content playback is then modified according to the user behavior data to produce a customized channel playback scenario (Block 608).

Figure 7:
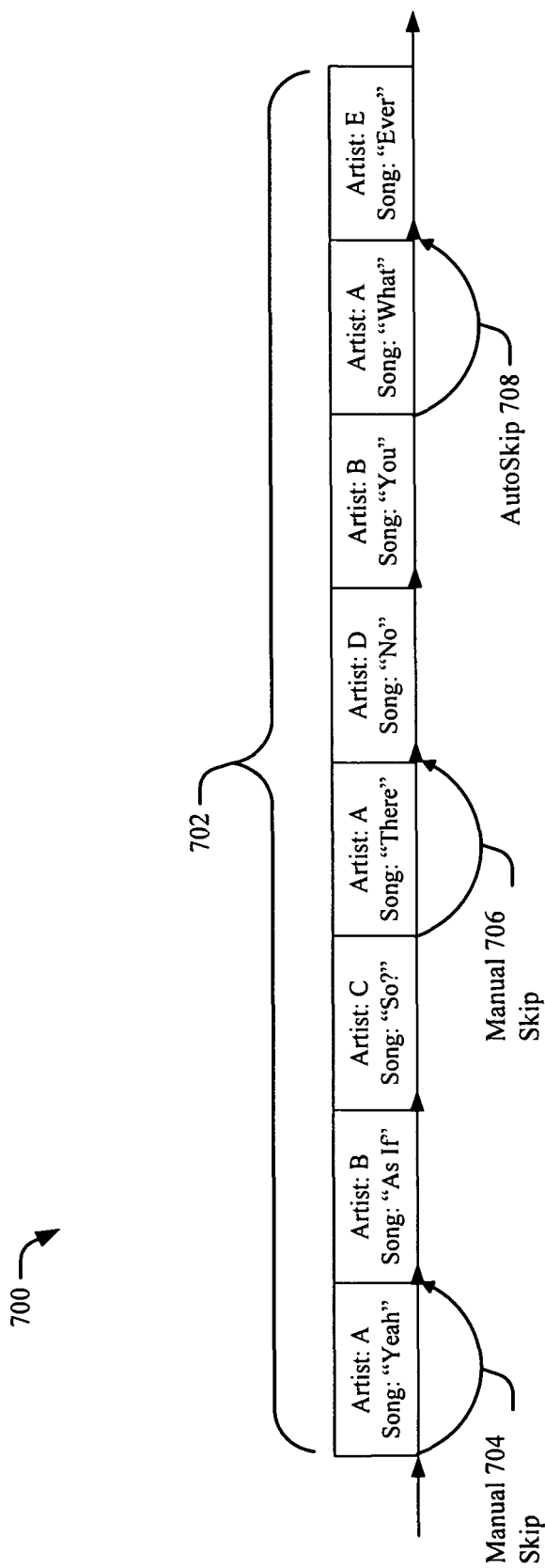
FIG. 7 is an illustration of channel segment modification based at least in part on user behavior data in accordance with one or more embodiments.

FIG. 7 illustrates at 700 one implementation of the customization of channel playback utilizing user behavior data in accordance with one or more embodiments. This example implementation includes a channel segment 702, which comprises a plurality of media content files. Channel segment 702 is a group of media content files that are in turn part of a channel that can include any number of channel segments and/or media content files. As indicated by the arrows, the playback order moves forward in time from left to right through the sequence of media content files. Although the individual media content files are illustrated here as music files, any suitable type of media content may be utilized.

Shown at 704 and 706 are "manual skips" that indicate that a user has pressed a skip button or activated some other mobile media device functionality to skip over the indicated songs. In this example, the user has manually skipped two songs by Artist A. In some embodiments, the mobile media device interprets this behavior as indicating that the user does not like songs by Artist A. When a subsequent media content file performed by Artist A is encountered during channel playback, the mobile media device can automatically skip forward over the media content file and play a subsequent media content file. As illustrated here, the mobile media device detects that the user has manually skipped two songs by Artist A, and thus at 708 the device automatically skips ("autoskips") over the next song that is encountered that is performed by Artist A (i.e., the song "What").

In some embodiments, acts 704 and 706 can include a user characterization of media content, such as the user pressing a "thumbs down" button that indicates that the user does not like the content being played. In these embodiments, a mobile media device can detect that the user does not like the media content and/or the artist performing the media content, and can store this information in a user preference database. When a subsequent media content file is encountered that is performed by Artist A (e.g., the song "What"), the mobile media device can automatically skip over the song.

Figure 8:
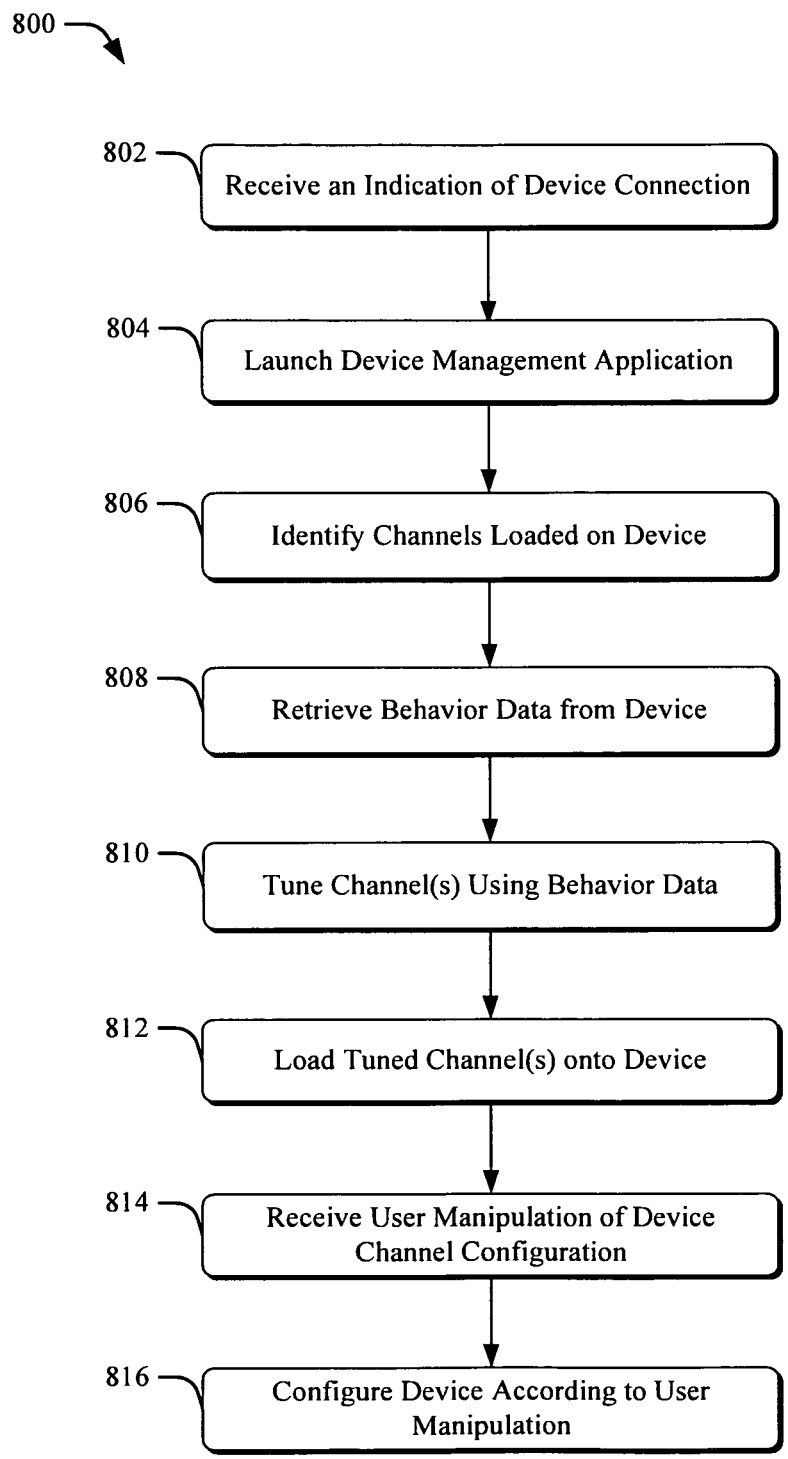
FIG. 8 is a flow diagram of a process for utilizing user behavior data to produce tuned channels in accordance with one or more embodiments.

FIG. 8 illustrates a flow diagram that represents a process 800 for using user behavior data to provide a user with custom tuned channels in accordance with one or more embodiments. At 802, an indication is received that the mobile media device is connected to a computing device. When the mobile media device is connected to the computing device, a connectivity session is initiated. A connectivity session refers to a condition of the mobile media device where the mobile media device is connected to the computing device (or any other suitable device). Thus, when the mobile media device is disconnected from the computing device, the connectivity session is terminated.

At 804, a device management application (e.g., content manager 130) is launched on the computing device. At 806, the device management application accesses the mobile media device and identifies one or more channels that are loaded on the mobile media device. The device management application then retrieves user behavior data from the mobile media device and makes the behavior data available to one or more channel management services (Block 808).

At 810, one or more channels are tuned utilizing the user behavior data. Channel tuning can be accomplished in a variety of different ways, a few of which are discussed below. Tuning a channel refers generally to a process of using behavior data to edit the collection of media content files that form a channel. Editing a collection of media content files can include adding and/or deleting media content from the collection. In some examples, when a refreshed version of a channel is available, the refreshed version of the channel is tuned based at least in part on user behavior data before it is loaded on the user's mobile media device. Thus, a user can not only be provided with a refreshed version of a channel, but the refreshed version can be tailored to the user's particular likes and/or dislikes with respect to media content.

At 812, one or more tuned channels are loaded onto the mobile media device. At 814, the user's manipulation of the mobile media device's channel configuration and/or media content configuration is received (e.g., via GUI 300). This manipulation can include the addition and/or deletion of channels from the mobile media device, as well as the addition and/or deletion of individual media content files from the mobile media device. At 816, the mobile media device is configured according to the user's manipulation of the channels and/or media content.

In some embodiments, one or more actions that occur during process 600 can be performed automatically by the computing device in response to the mobile media device being connected to the computing device. For example, when a user connects the mobile media device to the computing device, the computing device can automatically launch the device management application, identify channels loaded on the device, retrieve user behavior data, tune a channel, load the tuned channel onto the mobile media device, and/or present the channel user interface to the user, some or all without requiring user interaction.

Figure 9:
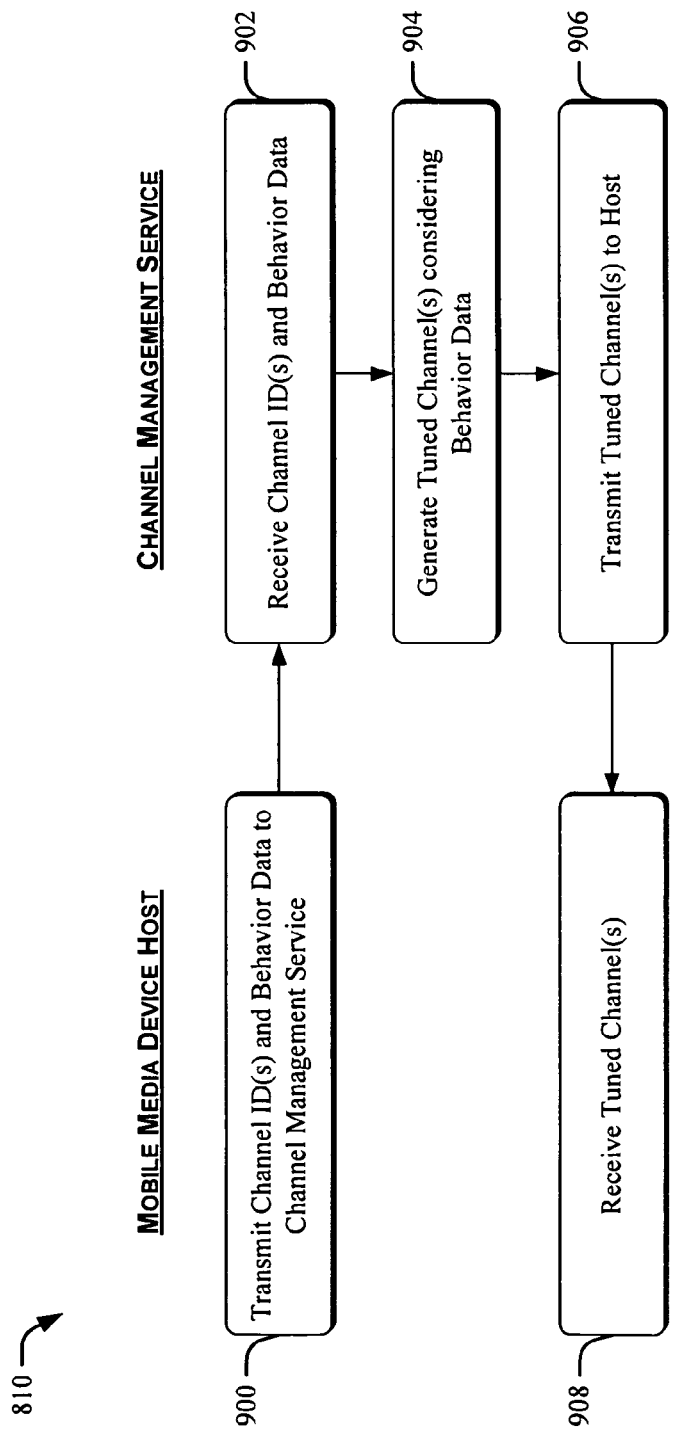
FIG. 9 is a flow diagram of a process for generating tuned channels utilizing user behavior data in accordance with one or more embodiments.

FIG. 9 illustrates a flow diagram that represents a process 810 for creating a tuned version of a channel, as discussed above in process 800 and in accordance with one or more embodiments. Process 810 includes acts that take place on a mobile media device host and acts that take place at a channel management service. In some embodiments, the channel management service can be remote from the device host, whereas in other embodiments the channel management service may reside on the device host itself.

At 900, one or more channel identifiers (IDs) and behavior data are transmitted from the mobile media device host to a channel management service. The channel ID(s) correspond to channels that are stored on the mobile media device. The channel ID(s) and the behavior data are received at the channel management service (Block 902). At 904, the behavior data is used to generate one or more tuned versions of the identified channels. One example of generating a tuned channel is discussed below. At 906, one or more tuned channels are transmitted back to the mobile media device host and at 908 the tuned channel(s) is received at the device host.

Figure 10:
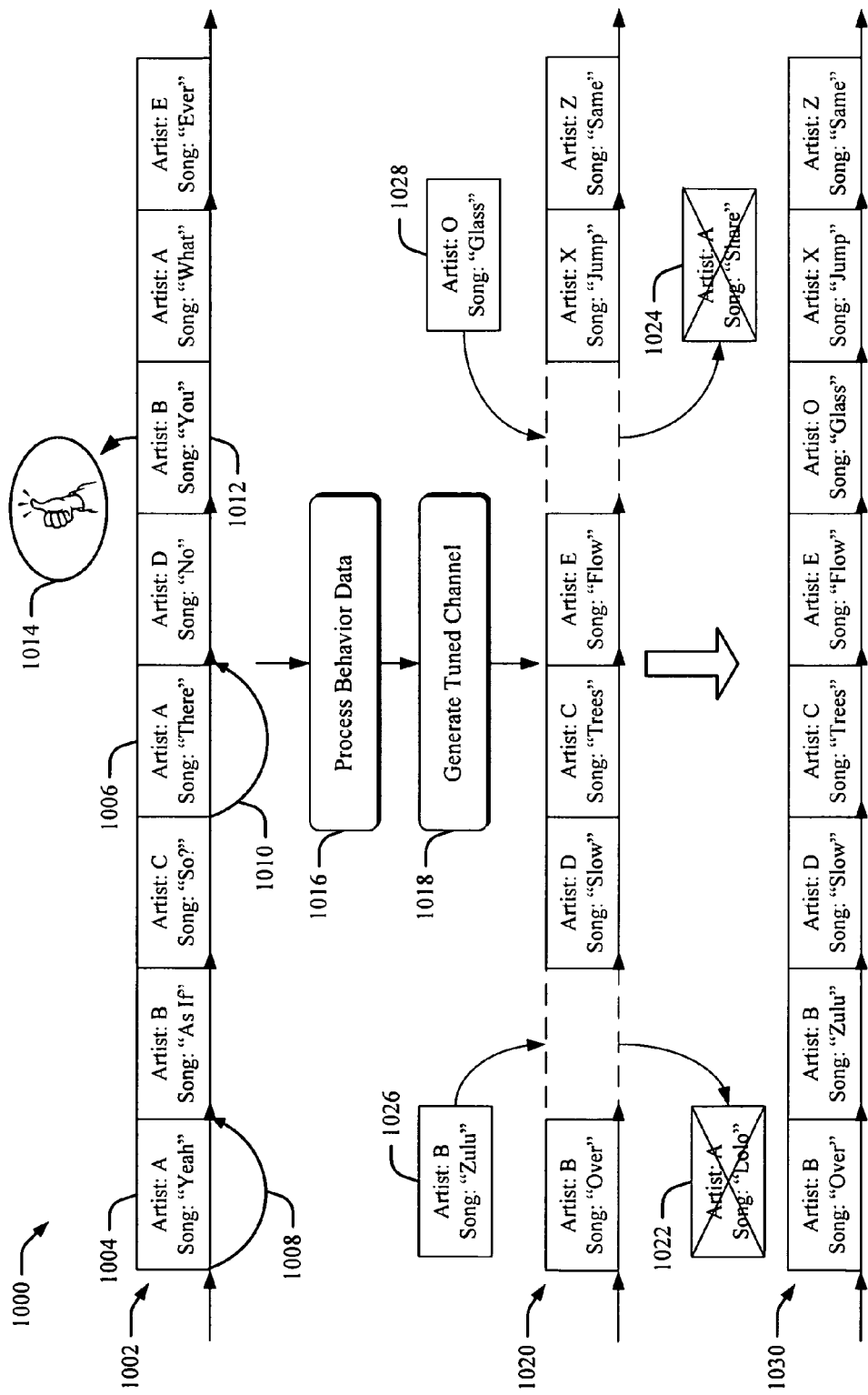
FIG. 10 is an illustration of one implementation of channel tuning utilizing user behavior data in accordance with one or more embodiments.

FIG. 10 illustrates one example of a process 1000 for generating a tuned channel according to one or more embodiments. A channel segment 1002 is illustrated that includes a plurality of media content files that are part of an instance of a channel. For purposes of this discussion, the channel is an "80's Rock" channel. Channel segment 1002 includes a media content file 1004 and a media content file 1006, both of these files being performed by the artist "A". As indicated at 1008 and 1010, during the playback of segment 1002 on a mobile media device, a user has manually skipped over media content files 1004 and 1006. The user has also characterized a media content file 1012 as a favorite by providing input to the mobile media device, such as pressing a favorites button 1014. The manual skipping and the activation of the favorites button 1014 are received by the mobile media device and stored as user behavior data.

At 1016, the user behavior data is processed so that it can be used to generate a tuned version of a channel. At 1018 a tuned channel is generated. To illustrate one example of a tuned version of a channel, a channel segment 1020 is illustrated that includes a plurality of media content files, which are part of the 80's Rock channel. In one embodiment, channel segment 1020 is part of a different instance of the 80's Rock channel than is channel segment 1002. For example, channel segment 1020 can be part of a refreshed version of the 80's Rock channel.

The behavior data indicates that the user does not like Artist A and/or songs performed by Artist A. Thus, as part of generating a tuned version of the 80's Rock channel, songs by Artist A (e.g., the media content files 1022 and 1024) are removed from channel segment 1020, as illustrated. Further, since the user has designated artist B and/or songs by artist B as a favorite, a media content file 1026 by artist B is inserted into the segment. A channel management service can also select other media content that matches the user's profile (e.g., based on the user's behavior data) and insert the selected media content into a channel that is tuned for the user. In this example, a media content file 1028 is selected and inserted into channel segment 1020. These insertions and deletions of media content files produce a tuned channel segment 1030 that is a tuned version of channel segment 1020 that can be loaded onto a user's mobile media device. This provides the user with an instance of the 80's Rock channel that is custom tailored to the user's particular likes and/or dislikes.

Figure 11:
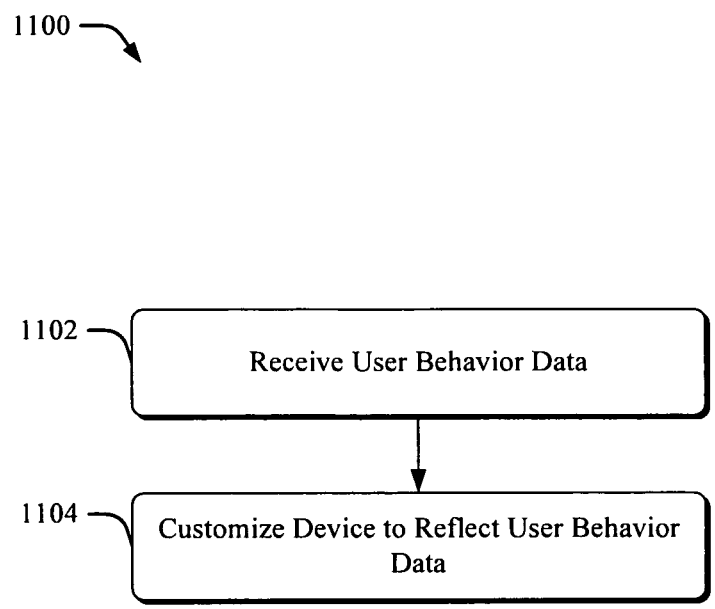
FIG. 11 is a flow diagram of a process for utilizing user behavior data to create a custom mobile media device in accordance with one or more embodiments.

FIG. 11 illustrates a flow diagram that represents a process 1100 for customizing a mobile media device based on behavior data. At 1102, user behavior data with respect to a mobile media device is received. At 1104, a mobile media device is customized to reflect one or more aspects of the user behavior data. In one example, a manufacturer receives user behavior data and pre-populates the mobile media device with media content that corresponds to the behavior data. For example, media content that is performed by an artist that the user has marked as a favorite can be loaded onto the device. The device can also be physically imprinted by a manufacturer or other entity with logos and other graphics that correspond to a user's favorite artist(s).

In one implementation, a person may order a mobile media device for another person ("recipient") as a gift, and based at least in part on the recipient's behavior data, the mobile media device can be custom designed and shipped to the recipient. The custom design could include custom media content, a custom graphical interface, a custom physical device decoration, and so on. Over time this customization morphs to reflect the user's preferences and taste as they change upon discovery of new artists and topics and as friends and family make recommendations. This customization can simultaneously extend across a variety of entry points to the media content experience: a mobile device, a PC client, an online media content service, and so on. The customized "personality" of the user is also exposed via the social aspects of the media content service so that other users can see it and interact.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

The above-described principles and techniques provide users of mobile media devices with an easily-accessible and dynamic media content experience. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, at a first user's mobile device, an interaction performed through a second user's mobile device, the first user's mobile device and the second user's mobile device associated through a social network, the interaction made with a first media content file in a first portion of a channel, the channel comprising a media content feed of media content files from a channel source, the channel source external to the first user's mobile device and the second user's mobile device, the interaction comprising a navigation behavior performed relative to the first media content file or a characterization of the first media content file;
   encountering, during consumption of the channel on the first user's mobile device, a second media content file having a similarity to the first media content file upon which the interaction was performed through the second user's mobile device;
   modifying, during the consumption of the channel on the first user's mobile device, a second portion of the channel by automatically skipping the second media content file based at least in part on the interaction performed through the second user's mobile device and with the first media content file in the first portion of the channel when the navigation behavior performed relative to the first media content file or the characterization of the first media content file indicates that the second user dislikes the first media content file; and
   continuing the consumption of the channel on the first user's mobile device by playing a third media content file subsequent to the second media content file of the media content feed of media content files.

2. A method as recited in claim 1, wherein the interaction performed by the second user is received from the social network and during consumption of the channel on the first user's mobile device.

3. A method as recited in claim 1, wherein the first media content file is a song and the similarity of the second media content file to the first media content file is a same artist.

4. A method as recited in claim 3, wherein the interaction performed by the second user skips or fast-forwards a song in the first portion and modifying the second portion includes deleting the song, a different song from a same artist as the song, or a similar song to the song.

5. A method as recited in claim 3, further comprising:
   repeating, reversing, or pausing a song in a third portion of the channel during consumption of the channel on the first user's mobile device; and
   modifying a fourth portion of the channel during consumption of the channel on the first user's mobile device to add the song, a different song from a same artist as the song, or a similar song to the song.

6. A method as recited in claim 1, wherein modifying the second portion modifies which media content files of the media content feed are played during the consumption of the second portion but not which media content files comprise the media content feed.

7. A method as recited in claim 1, further comprising, prior to the consumption of the channel, receiving a link to the channel from the second user.

8. A method as recited in claim 1, wherein the characterization of the first media content file comprises a qualitative assessment of the first media content file.

9. A method as recited in claim 8, wherein the qualitative assessment is received through selection of a control other than a navigation control.

10. A method as described in claim 1, wherein the first user's mobile device includes a first wireless interface, the second user's mobile device includes a second wireless interface, and the channel source is a remote resource configured to connect to the first user's mobile device via the first wireless interface and second user's mobile device via the second wireless interface.

11. A mobile device comprising:
    one or more processors;
    one or more computer-readable storage media coupled to the one or more processors;
    computer-executable instructions stored on the computer-readable storage media that, when executed by the one or more processors, implement a method comprising:
       receiving at the mobile device, which is associated with a first user, an interaction performed through a second user's mobile device, the mobile device and the second user's mobile device associated through a social network via the first user and the second user, the interaction made with a first media content file in a first portion of a channel during consumption of the channel on the second user's mobile device, the channel comprising a media content feed of media content files from a channel source, the channel source external to the mobile device associated with the first user and the second user's mobile device, the interaction comprising a navigation behavior performed relative to the first media content file or a characterization of the first media content file;

encountering, during consumption of the channel on the mobile device, a second media content file having a similarity to the first media content file upon which the interaction was performed through the second user's mobile device;

modifying, during the consumption of the channel on the mobile device, a second portion of the channel by automatically skipping the second media content file based at least in part on the interaction performed through the second user's mobile device and with the first media content file in the first portion of the channel when the navigation behavior performed relative to the first media content file or the characterization of the first media content file indicates that the second user dislikes the first media content file; and continuing the consumption of the channel on the mobile device by playing a third media content file subsequent to the second media content file of the media content feed of media content files.

12. A mobile device as recited in claim 11, wherein the interaction performed by the second user is received from the social network and during consumption of the channel on the mobile device.

13. A mobile device as recited in claim 11, wherein the first media content file is a song and the similarity to the second media content file is a same artist.

14. A mobile device as recited in claim 13, wherein the second user's interaction skips or fast-forwards a song in the first portion and modifying the second portion includes deleting the song, a different song from a same artist as the song, or a similar song to the song.

15. A mobile device as recited in claim 13, wherein the computer-executable instructions when executed by the one or more processors implement the method to further comprise:

repeating, reversing, or pausing a song in a third portion of the channel during consumption of the channel on the mobile device; and modifying a fourth portion of the channel during consumption of the channel on the mobile device to add the song, a different song from a same artist as the song, or a similar song to the song.

16. A mobile device as recited in claim 11, wherein modifying the second portion modifies which media content files of the media content feed are played during the consumption of the second portion but not which media content files comprise the media content feed.

17. A mobile device as recited in claim 11, wherein modifying the second portion is performed using the external channel.

18. A mobile device as recited in claim 11, wherein the characterization of the first media content file comprises a qualitative assessment of the first media content file.

19. A mobile device as recited in claim 18, wherein the qualitative assessment is received through selection of a control other than a navigation control.

20. A mobile device as recited in claim 11, wherein the mobile device further comprises a wireless interface and the channel source is a remote resource configured to connect to the mobile device via the wireless interface.

* * * * *